United States Patent [19]

Lancaster

[11] Patent Number: 5,056,653
[45] Date of Patent: Oct. 15, 1991

[54] ROLLER CONVEYOR

[75] Inventor: William G. Lancaster, Louisville, Ky.

[73] Assignee: Lantech, Inc., Louisville, Ky.

[21] Appl. No.: 467,368

[22] Filed: Jan. 19, 1990

[51] Int. Cl.$^5$ .............................................. B65G 13/07
[52] U.S. Cl. ..................................... 198/790; 198/789
[58] Field of Search ......................... 198/789, 790, 791

[56] References Cited

U.S. PATENT DOCUMENTS

| | | | |
|---|---|---|---|
| 1,812,976 | 7/1931 | Nistle | 198/790 |
| 3,181,688 | 5/1965 | Schermer | 198/789 |
| 3,327,837 | 6/1967 | Covell | 198/789 |
| 3,587,828 | 6/1971 | Ferko | 198/790 |
| 4,013,161 | 3/1977 | Nelson | 198/789 X |
| 4,266,660 | 5/1981 | Herman | 198/791 X |
| 4,349,100 | 9/1982 | McLean | 198/790 X |
| 4,355,715 | 10/1982 | Chorlton | 198/790 X |

FOREIGN PATENT DOCUMENTS

| | | | |
|---|---|---|---|
| 2306476 | 4/1974 | Fed. Rep. of Germany | 198/789 |
| 3516097 | 11/1986 | Fed. Rep. of Germany | 198/789 |
| 0816879 | 3/1981 | U.S.S.R. | 198/789 |

*Primary Examiner*—Robert P. Olszewski
*Assistant Examiner*—James R. Bidwell
*Attorney, Agent, or Firm*—Finnegan, Henderson, Farabow, Garrett & Dunner

[57] ABSTRACT

A conveyor includes a frame and a series of closely spaced rollers. Each roller has an outer circumferential surface, a first end portion journalled on an axle supported by the frame on one side of the conveyor and a second end portion journalled on an axle supported by the frame on the other side of the conveyor. The rollers include master rollers and slave rollers interpersed between the master rollers. A drive train is provided for driving every roller in the series of closely spaced rollers. The drive train includes a primary drive train for driving the master rollers and secondary drive trains for driving the slave rollers from respective master rollers. The primary drive train includes relatively large diameter high torque primary sprockets mounted on the outer circumferential surfaces of the first end portion of the master rollers and chains connecting and driving the primary sprockets. The secondary drive train includes relatively small diameter low torque secondary sprockets mounted on the axial ends of the second end portion of the rollers and chains connecting and driving the secondary sprockets. The relatively large diameter primary sprockets form a high profile on one side of the conveyor. The relatively small diameter secondary sprockets form a low profile on the other side of the conveyor.

28 Claims, 7 Drawing Sheets

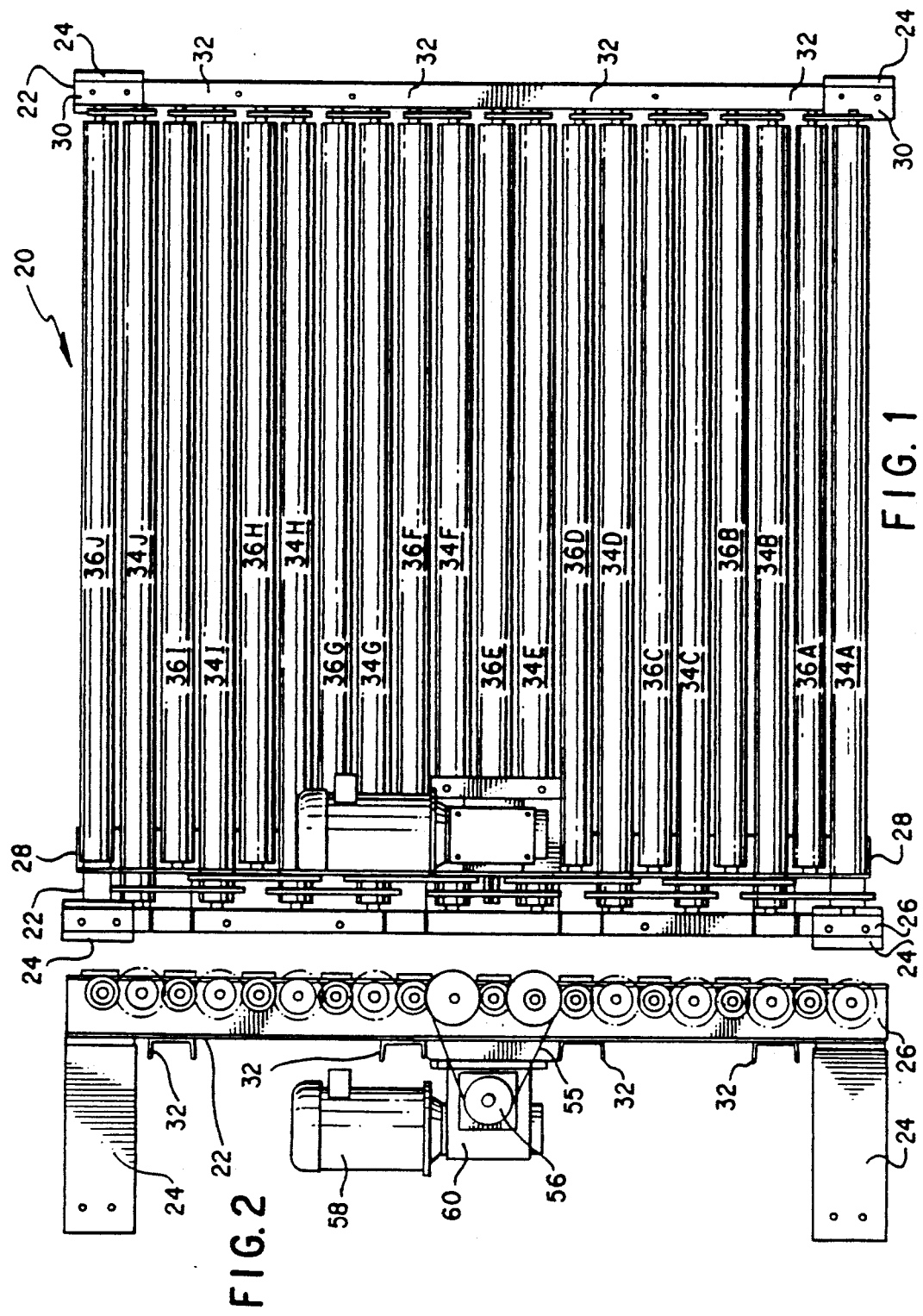

ROLLER CONVEYOR

BACKGROUND OF THE INVENTION

The present invention relates to roller conveyors. Conventional roller conveyors employ a series of rollers mounted between two sides of a frame. The rollers are driven to convey objects along the length of the conveyor.

In some instances, it is necessary or desirable to have the rollers as close together as possible. This is especially important when conveying objects which are small, unevenly shaped, fragile, or otherwise difficult to handle. For example, when pallet loads are stacked on pallets having spaced boards running parallel to the rollers, the rollers must be positioned sufficiently close together to prevent the boards from lodging between the rollers. Similarly, when the load includes a group of small objects stacked in columns, the rollers must be positioned sufficiently close together to prevent the small objects from falling between the rollers.

In some instances, it is necessary or desirable to drive each roller in a series of closely spaced rollers. This eliminates nip points and is especially important when the objects being conveyed are small, when the objects are covered with packaging or include loose parts, or when it is necessary to provide additional protection against having the rollers seize and injure the fingers of personnel.

In such instances, the lack of space between the rollers and the need to drive each roller presents constraints on designing economical drive mechanisms which are durable and supply sufficient torque to power the series of rollers.

One way of mounting rollers on a conveyor frame is to use rollers which have narrow shafts fixed to each end. The narrow shafts are supported by the inner races of bearings, and the outer races of the bearings are fixed to the frame. The rollers can be driven by driving the shafts. The narrow shafts allow room for sprockets and permit the rollers to be closely spaced with every roller driven. However, this mounting arrangement is significantly more expensive than other mounting arrangements.

A less expensive arrangement involves mounting the outer races of bearings inside the rollers, mounting the inner races of the bearings on axles and fixing the axles to a frame. While this arrangement is much less expensive, the rollers cannot be driven by driving the axles. Rather it is necessary to drive the rollers by driving the roller surfaces directly, or by driving an element attached to the outer circumferential surface of the rollers or the axial ends of the rollers.

Attaching drive sprockets to the outer circumferential surface of the rollers is a relatively inexpensive procedure which provides the rollers with a durable mechanism for receiving and supplying high levels of torque. However, it places severe limitations on the positioning of the drive train and how closely it is possible to space a series of rollers in which every roller is driven.

It is possible to use drive sprockets attached to the outer circumferential surface of the rollers and drive every roller in a series of closely spaced rollers. However, to do so, it has been necessary to stagger the axial ends of neighboring rollers on both sides of the conveyor, mount the drive sprockets on the end portions of the outer circumferential surfaces of the rollers on both sides of the conveyor, have the drive train drive every other roller along one side of the conveyor, use one of these rollers to transmit power to the other side of the conveyor and continue the drive train along the other side of the conveyor, driving every other roller on that other side of the conveyor.

Having the externally mounted sprockets of the power train start along one side of the conveyor and continue along the other side of the conveyor causes difficulties in loading and unloading products from the side of the conveyor. Since the sprockets extend substantially above the conveying surface of the series of rollers on both sides of the conveyor, they interfere with loading and unloading products from both sides of the conveyor. This makes the use of a forklift substantially more difficult and time consuming, and increases the likelihood of damaging the conveyor components while using a forklift.

One way to avoid such interference on the side of the conveyor is to attach gears to the axial ends of the rollers at one side of the conveyor and connect the gears with idler gears to form a drive train. However, this arrangement is much more expensive and requires much greater precision than the other arrangements described.

A wide variety of arrangements have been used to support, journal, and drive the rollers on conventional roller conveyors. However, none of the conventional roller conveyors provide an apparatus which is economical to build, durable in operation and capable of supplying sufficient torque, when the rollers need to be closely spaced with every roller driven and when it is necessary to have no conveyor components above the conveying surface of the series of rollers on one side of the conveyor which interfere with loading and unloading the conveyor.

SUMMARY OF THE INVENTION

Accordingly, it is an object of the present invention to provide a roller conveyor which is economical to build, durable in operation, and capable of supplying sufficient torque to power the series of rollers.

It is another object of the present invention to provide a roller conveyor which has these qualities and is usable in applications in which the rollers need to be closely spaced, every roller in the series of rollers needs to be driven and the conveyor needs to have a low side which does not provide interference above the conveying surface of the rollers.

Additional objects and advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purpose of the invention as embodied and broadly described herein, there is provided a conveyor having a frame and a series of rollers mounted on the frame. Each roller has an outer circumferential surface, a first end portion on a first side of the conveyor and a second end portion on a second side of the conveyor. The rollers include master rollers and slave rollers interspersed between the master rollers.

The conveyor also includes a drive train for driving every roller in the series of rollers. The drive train includes a primary drive train for driving the master rollers and secondary drive trains for driving the secondary rollers from respective master rollers.

The primary drive train includes primary drive elements on the master rollers and means for connecting and driving the primary drive elements which together form an effective outer radius for each primary drive element for purposes of radial clearance between the rollers.

The secondary drive train includes secondary drive surfaces and means for connecting and driving the secondary drive surfaces which together form an effective outer radius for each secondary drive element for purposes of radial clearance between the rollers.

The effective outer radius of each of the primary drive elements is greater than the radial distance from the center of the roller on which it is located to the outer circumferential surface of the nearest roller in the series of rollers. The effective outer radius of each of the secondary drive elements is less than the radial distance from the center of the roller on which it is located to the outer circumferential surface the nearest roller in the series of rollers.

The primary drive elements preferably are primary sprockets located on the outer circumferential surface of the first end portion of the master rollers and the secondary drive elements preferably are secondary sprockets located on the axial end of the second end portion of the rollers. It is preferable that the means for connecting the primary drive elements are endless loop means such as chains.

The rollers preferably are journalled on axles. Portions of the axles extend from the first end portion of the rollers and are fixed to the first side of the frame. Portions of the axles extend from the second end portion of the rollers and are fixed to the second side of the frame.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 shows a top plan view of a conveyor incorporating the teachings of the present invention.

FIG. 2 shows a left side elevation view of the conveyor shown in FIG. 1.

DETAILED DESCRIPTION OF THE DRAWINGS

Reference will now be made in detail to the present preferred embodiment of the invention as illustrated in the accompanying drawings.

Figure 3:
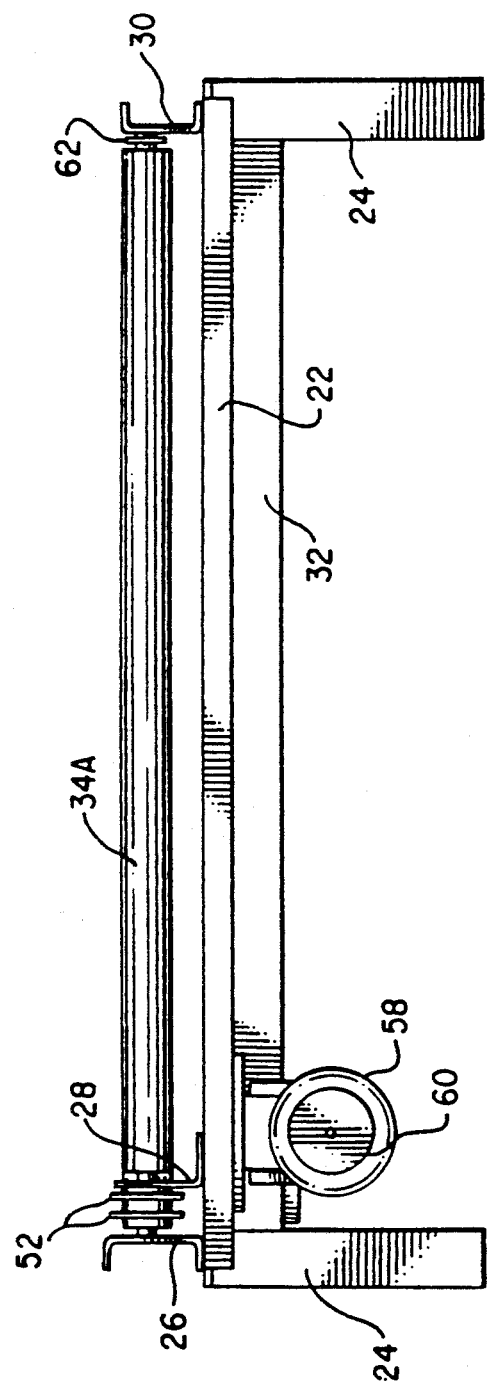
FIG. 3 shows an end elevation view of the conveyor shown in FIG. 1.

In accordance with the present invention, there is provided a conveyor having a frame. As embodied and shown in FIG. 1 through FIG. 3, conveyor 20 has a frame 22 which includes a series of side beams 26, 28 and 30 that run along the sides of the conveyor 20. Frame 22 also includes cross beams 32 that run across the width of the conveyor 20 between side beams 26 and 28 on the left side of the conveyor 20 and side beam 30 on the right side of the conveyor. Frame 22 further includes legs 24 which support beams 26, 28, 30 and 32.

According to the present invention, a series of closely spaced rollers are mounted on the frame. As shown in FIG. 1, the rollers include master rollers 34a through 34j and slave rollers 36a through 36j interspersed between master rollers 34a through 34j. In the embodiment shown, the master rollers and slave rollers alternate with each other. However, other arrangements may also be used. If the roller conveyor is used to convey pallet loads supported by pallets, it currently is preferably to use rollers which are two and one half inches in diameter and have centers spaced two and three quarter inches.

According to the present invention, each roller includes an outer circumferential surface, a first end portion on a first side of the conveyor and second end portion on a second side of the conveyor. As shown in FIG. 1, the rollers 34 and 36 each have a first end portion oriented on the first or left side of the conveyor, and have a second end portion oriented on the second or right side of the conveyor.

It is preferable that the rollers are journalled on axles fixed to the frame. Portions of the axles extend from the first end portion of the rollers and are fixed to the frame on the first side of the conveyor. Portions of the axles extend from the second end portion of the rollers and are fixed to the frame on the second side of the conveyor.

Figure 4:
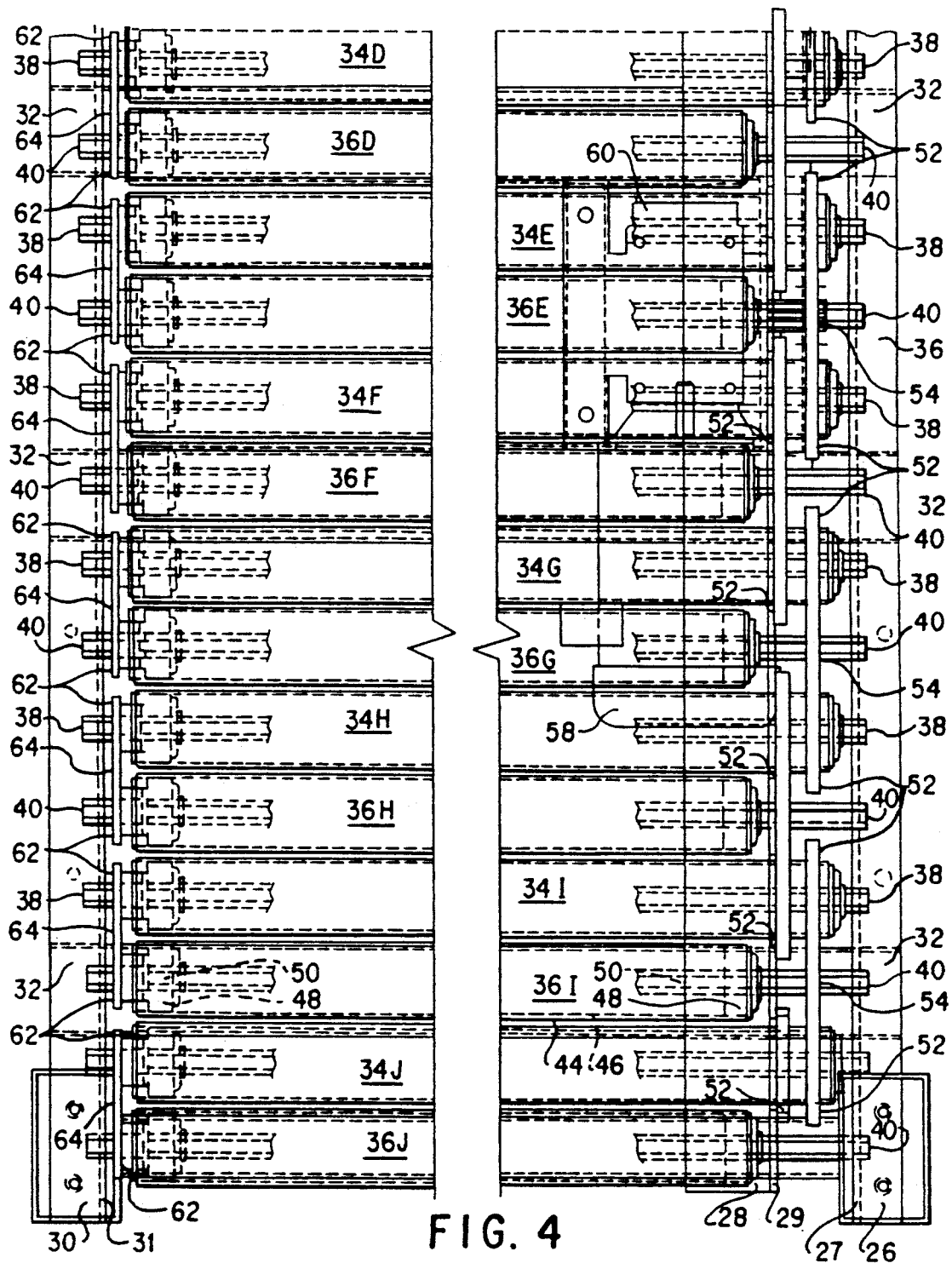
FIG. 4 shows portions of the conveyor shown in FIG. 1 in a larger scale.
Figure 6:
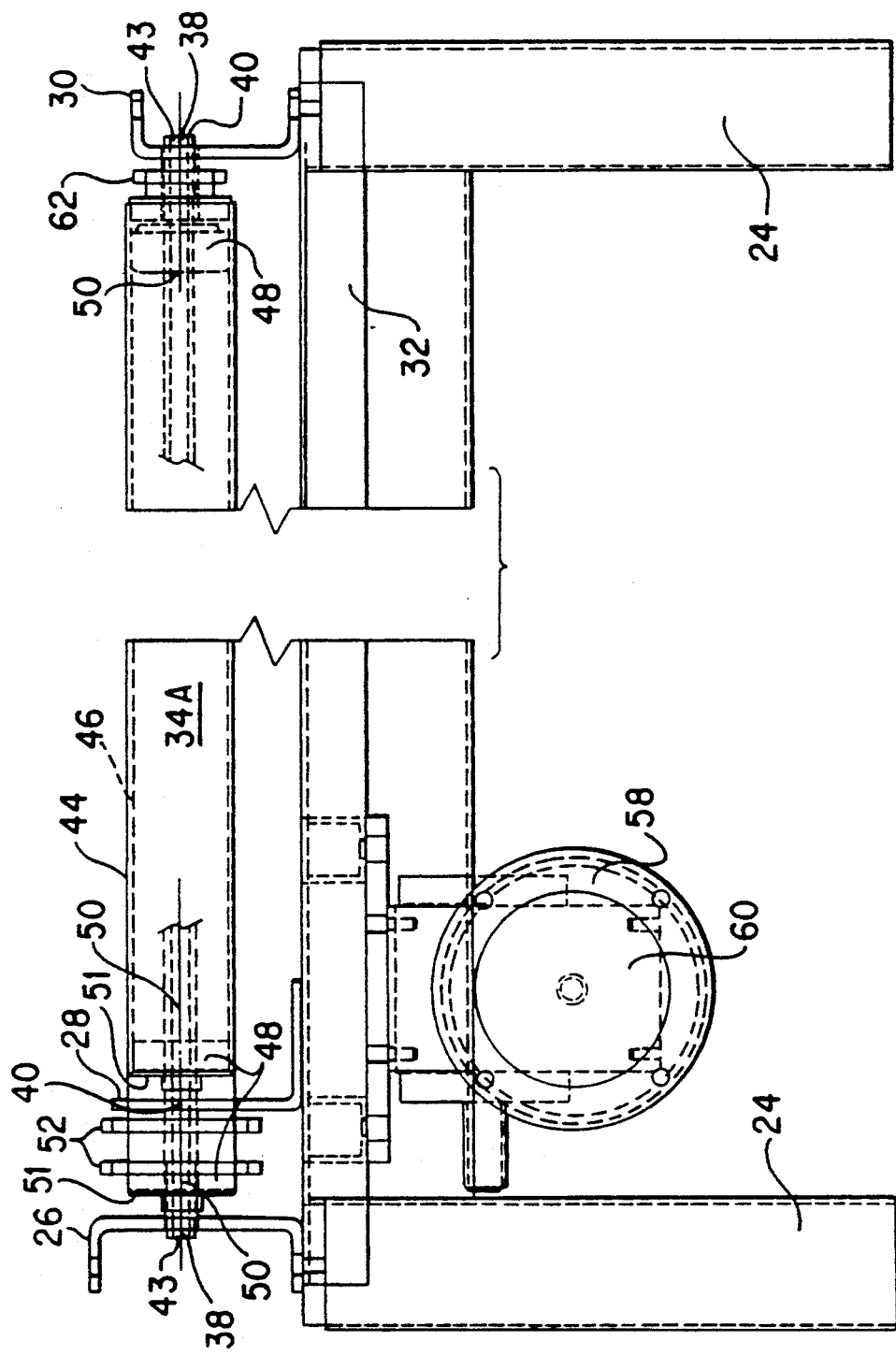
FIG. 6 shows portions of FIG. 3 in a larger scale.
Figure 8:
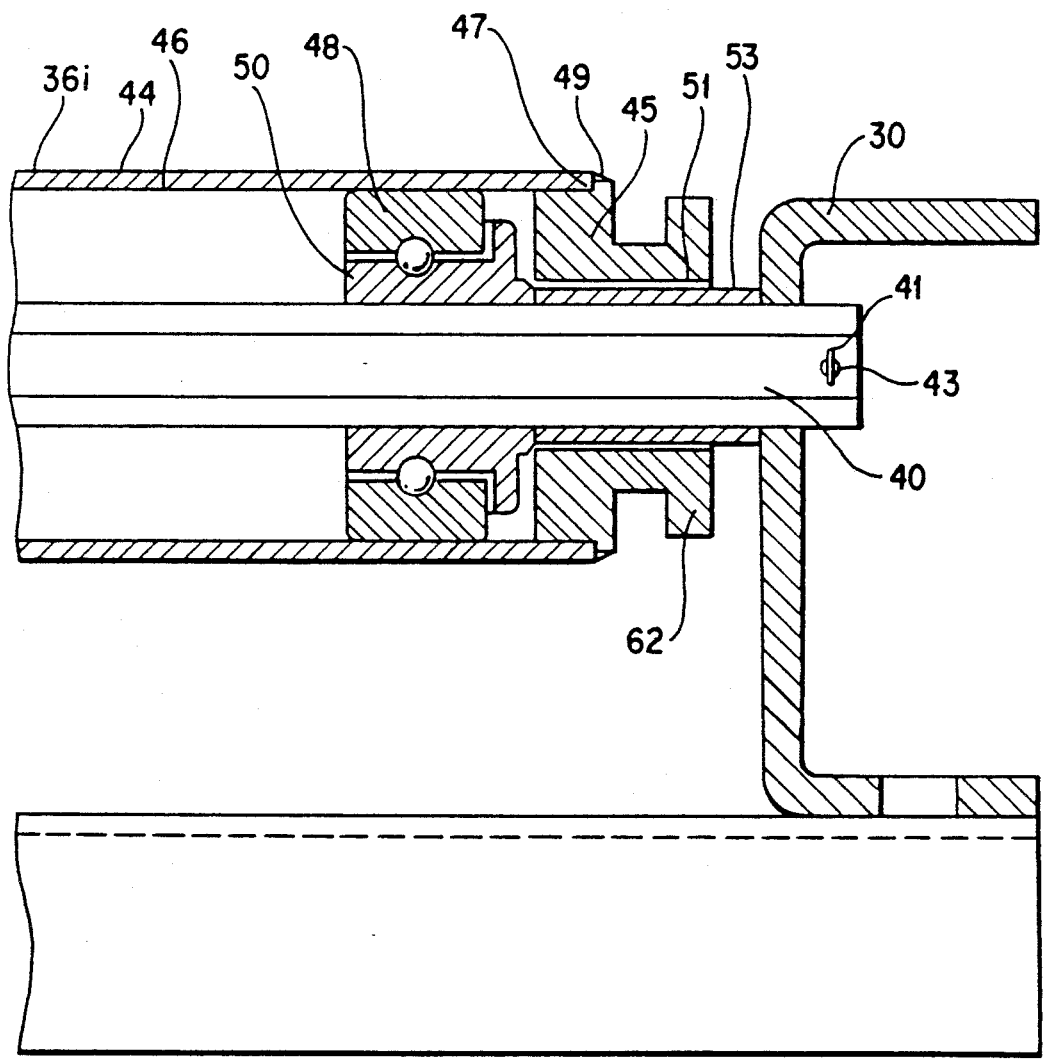
FIG. 8 shows a partial end view in partial cross section of the conveyor shown in FIG. 1.

As shown in FIG. 4, the first end portions of the master rollers 34 are journalled on axles 38 of hexagonal cross-section. Axles 38 extend throughout the length of the rollers and are mounted in complimentary hexagonal holes in a vertically extending flange 27 of side beam 26. Similarly, the first end portions of slave rollers 36 are journalled on axles 40 of hexagonal cross-section. Axles 40 extend throughout the length of the rollers 36 and are mounted in complimentary hexagonal holes in a vertically extending flange 29 of side beam 28. As shown in FIGS. 6 and 8, cotter pins 41 in holes 43 prevent axial movement of axles 38 and 40 relative to the frame.

The second end portions of master rollers 34 are journalled on axles 38, and the second end portions of slave rollers 36 are journalled on axles 40. The portions of axles 38 and 40 extending from the second end portions of rollers 34 and 36 have hexagonal cross-sections which are mounted in complimentary hexagonal holes in a vertically extending flange 31 of side beam 30.

As shown in FIGS. 4 and 8, and specifically noted on roller 36i, the outer circumferential surface 44 and the inner circumferential surface 46 of each roller 34 and 36 is a cylindrical surface since the rollers are cylinders. Each journal includes bearings having an inner bearing race 50 which is fixed to the axle of a roller, and an outer bearing race 48 which is press fitted and fixed to the inside surface 46 of the roller and rotates with the roller, around inner bearing race 50.

As shown in FIG. 6, the outer bearing race 48 of each bearing on the first end portion of the rollers on the left side of the conveyor includes a flange 51 which rests against the axial end of the first end portion of the rollers. Inner bearing race 50 has a sleeve portion which helps to maintain the axial position of the roller assembly relative to the frame. The bearings on the second end portion of the rollers on the right side of the conveyor are detailed in FIG. 8.

According to the present invention, there is provided a drive train for driving every roller in the series of rollers. The drive train includes a primary drive train for driving the master rollers and secondary drive trains for driving the slave rollers from respective master rollers. The primary drive train includes primary drive elements located on the master rollers and means for connecting and driving the primary drive elements.

Figure 5:
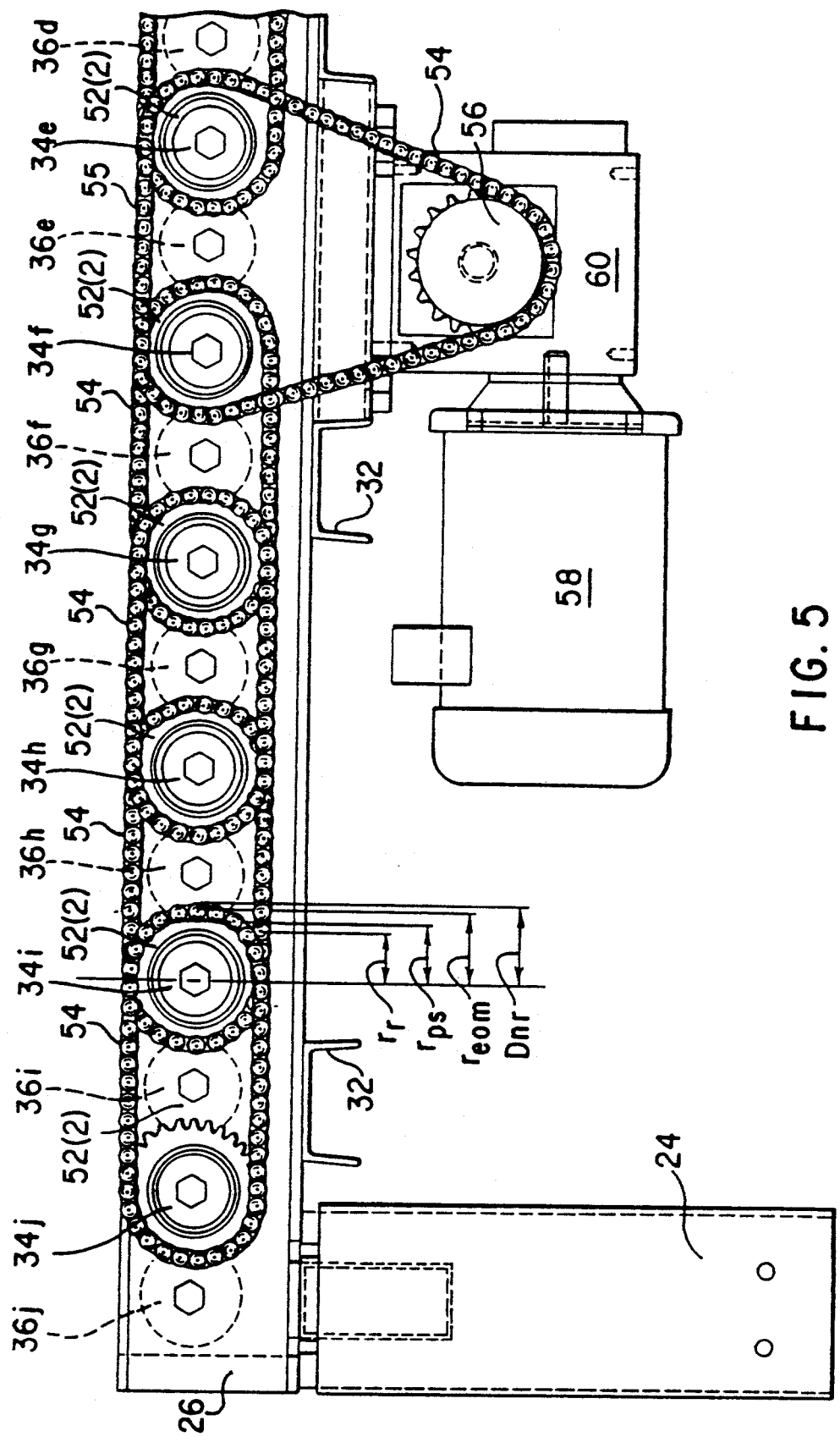
FIG. 5 shows a portion of FIG. 2 in a larger scale.

As shown in FIGS. 4 and 5, the master drive elements include primary sprockets 52 which are mounted on the outer circumferential surface 44 of the master rollers 34. Each primary sprocket 52 is a large diameter circular plate having teeth around its outer periphery to engage a positive drive device such an endless chain or ribbed positive drive belt. In the embodiment shown with two and one half inch diameter rollers with centers spaced two and three quarters inches, the primary sprockets have an outside diameter of 3.97 inches.

Each primary sprocket 52 has a central circular aperture which is the same diameter as the outer circumferential surface 44 of master rollers 34. Primary sprockets 52 are assembled to master roller 34 by sliding primary sprockets 52 on the outer circumferential surface 44 of the first end portion of master rollers 34 and welding them in place. Primary sprockets 52 can also be attached to master rollers 34 by other means such as slots and keys.

Although it is presently preferable to use sprockets which are assembled to the master rollers, other primary drive elements, including those integrally located or formed on the surface of the rollers may be used.

The means for connecting and driving the primary drive elements preferably includes endless loop means. As shown in FIG. 5, the endless loop means includes primary drive chains 54 and 55. Although it is presently preferable to use chains, other means compatible with the primary drive elements may be used to connect the primary drive elements, including other endless members such as transmission belts and ribbed positive drive belts.

Chain 55 connects the outer sprockets of master rollers 34e and 34f to drive sprocket 56, shown in FIGS. 2 and 5. Drive sprocket 56 is driven by a drive motor 58 through a gear reducer 60. As shown in FIG. 1, the drive motor arrangement preferably is positioned and connected to master rollers 34e and 34f near the center of the series of rollers. This minimizes the length of the power train between the motor and the last driven roller.

As shown in FIG. 4, 5 and 6, each master roller 34 has two primary sprockets 52 in spaced relation on the first end portion of master roller 34. Endless chains 54 connect pairs of master roller sprockets 52 to link the master rollers 34 and form a power train which continues outward from both sides of the center of the series of conveyors. Each master roller drives the next master roller through a pair of sprockets 52 and endless chains 54. Because of the large diameter and arrangement of sprockets 52, master rollers 34 can receive and transmit a substantial amount of power. Although it is presently preferable to use a plurality of endless chains to drive pairs of primary sprockets 52, a single endless chain alternatively may be used.

According to the present invention, the secondary drive trains include secondary drive elements and means for connecting and driving the secondary drive elements.

Figure 7:
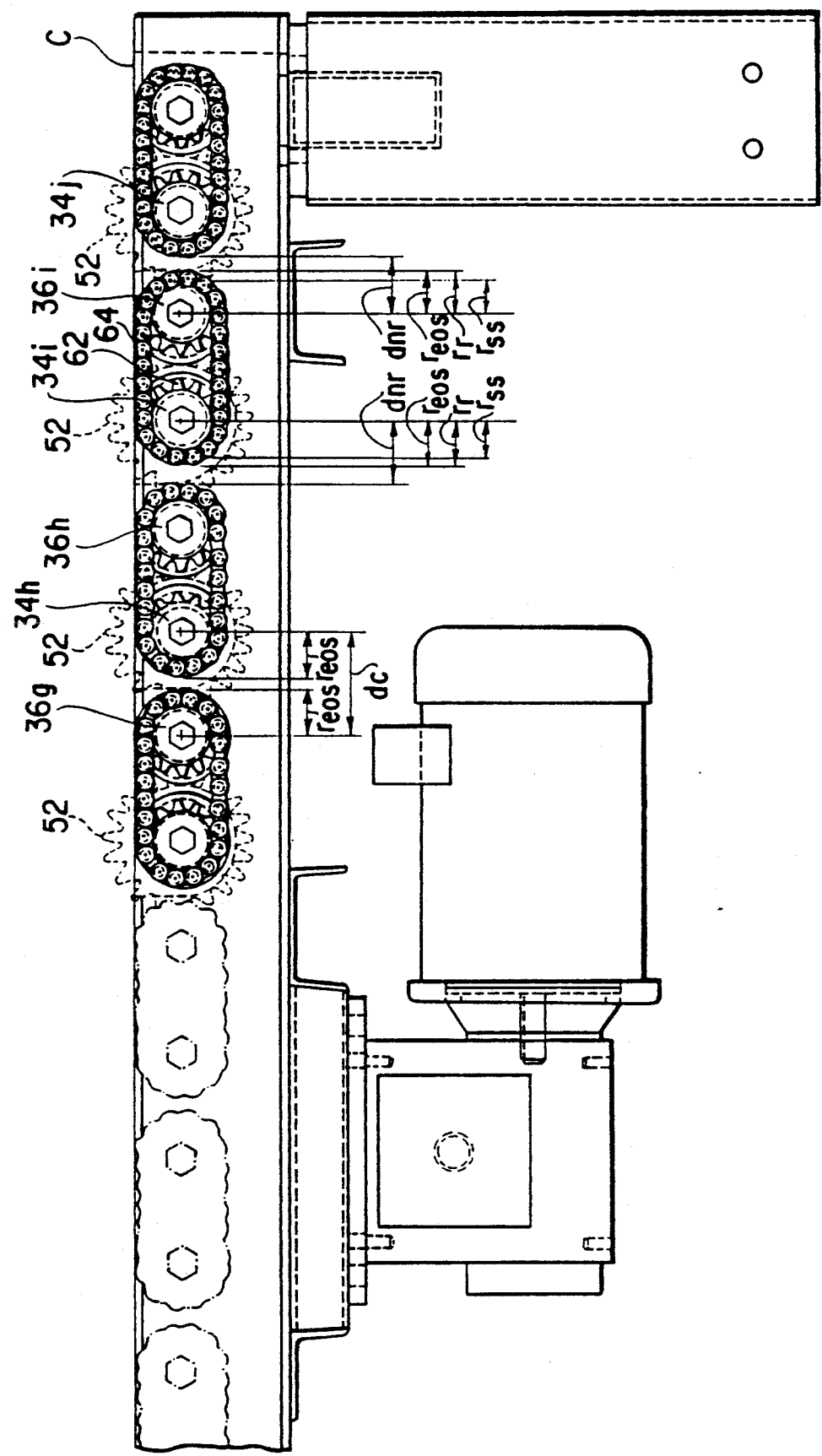
FIG. 7 shows a partial right side elevation view of the conveyor shown in FIG. 1.

As shown in FIGS. 7 and 8, the secondary drive elements include secondary sprockets 62. Secondary sprockets 62 of the secondary drive train are smaller in diameter than primary sprockets 52 of the primary drive train. In the embodiment shown with two and one half inch diameter rollers with centers spaced two and three quarter inches, and primary sprockets having an outside diameter of 3.97 inches, it is presently preferable to use secondary sprockets having an outside diameter of 2.39 inches.

As detailed in FIG. 8, secondary sprockets 62 are integral with a circular flange element 45 which is inserted into the inside of the second end portions of master rollers 34 and slave rollers 36. The secondary sprockets 62 are secured to the axial end 47 of the second end portions by a weld 49.

Secondary sprockets 62 have a central circular aperture 51. A cylindrical sleeve 53 is positioned within aperture 51 between beam 30 and inner bearing member 50 to help maintain the axial position of the roller assembly relative to the frame.

Although it is presently preferable to use secondary sprockets which are assembled to the rollers, other secondary drive elements, including those integrally-located or formed on the surface of the rollers may be used.

The means for connecting and driving the secondary drive elements includes endless secondary chains 64 which connect each slave roller 36 with a respective master roller 34 so that it is driven by the master roller 34. For example, as shown in FIG. 4, slave roller 36j is driven by master roller 34j, slave roller 36i is driven by master roller 34i.

Although it is presently preferable to use chains, other means compatible with the secondary drive elements may be used to connect the secondary drive elements, including other endless members such as transmission belts and ribbed positive drive belts. Alternatively, since the secondary drive trains do not transmit a high level of torque, friction rollers may be used for the secondary drive trains.

In this manner, every roller is driven. Although in the preferred embodiment each master roller 34 is shown paired with a single slave roller 36 having the same letter suffix, it is also within the scope of the present invention to drive several slave rollers from each master roller.

According to the present invention, the primary drive elements of the primary drive train located on the master rollers and the means for connecting and driving the primary drive elements together form an effective outer radius for each primary drive element for purposes of radial clearance between the rollers.

As shown in FIG. 5, the primary drive element of the master rollers are their associated primary sprockets 52, and the means for connecting and driving the primary drive elements are chains 54. The radius of the master rollers is $r_r$. The radius of the primary drive element, primary sprocket 52, is $r_{ps}$. The effective outer radius of the primary drive element, primary sprocket 52, together with the means for connecting and driving, chain 54, is $r_{eom}$. The radial distance from the center of the roller on which primary drive element, primary sprocket 52, is located, to the outer circumferential surface of the nearest roller in the series of rollers is $d_{nr}$.

According to the present invention, the effective outer radius of each of the primary drive elements is greater than the radial distance from the center of the roller on which it is located to the outer circumferential surface of the nearest roller in the series of rollers. As shown in FIG. 5, $r_{eom}$ is greater than $d_{nr}$.

According to the present invention, the secondary drive elements of the secondary drive train located on the rollers and the means for connecting and driving the secondary drive elements together form an effective outer radius for each secondary drive element for purposes of radial clearance between the rollers.

As shown in FIG. 7, the secondary drive element of the rollers are their associated secondary sprockets 62, and the means for connecting and driving the secondary drive elements is chain 64. The radius of the rollers is $r_r$. The radius of the secondary drive element, secondary sprocket 62, is $r_{ss}$. The effective outer radius of the secondary drive element, secondary sprocket 62, together with the means for connecting and driving, chain 64, is $r_{eos}$. The radial distance from the center of the roller on which secondary drive element, secondary sprocket 62, is located, to the outer circumferential surface of the nearest roller in the series of rollers is $d_{nr}$.

According to the present invention, the effective outer radius of each of the secondary drive elements is less than the radial distance from the center of the roller on which it is located to the outer circumferential surface of the nearest roller in the series of rollers. As shown in FIG. 7, $r_{eos}$ is less than $d_{nr}$.

According to the present invention, it is preferable that pairs of adjacent secondary drive elements have effective outer radii which when totalled are less than the distance between the centers of the rollers on which the pairs of adjacent secondary drive elements are located.

As shown in FIG. 7, the total of the effective outer radii of adjacent secondary drive elements, sprockets 62, of rollers 34h and 36g is less than the distance $d_c$ between the centers of those rollers, namely, $2(r_{eos})$ is less than $d_c$.

In accordance with the present invention, it is preferable that the radius of the outer circumferential surface of the rollers is at least as great as the effective outer radius of the secondary drive elements. As shown in FIG. 7, these two quantities are equal, namely, $r_r$ equals $r_{eos}$.

In accordance with the present invention, it is preferable that the outer circumferential surfaces of the rollers define a conveyor surface which is at least as high in elevation as the secondary drive trains. As shown in FIG. 7, the highest elevation E of the outer circumferential surfaces 44 of the rollers 34 and 36 define a horizontal conveyor surface C which is equal in elevation to the highest elevation E of the sprockets 62 and chains 64 of the secondary drive trains.

The present invention provides a roller conveyor having a primary drive train and secondary drive trains which permit the use of a number of relatively small diameter sprockets. Such small diameter sprockets in the secondary drive trains allow the secondary drive trains to have a low profile. As a result, the secondary drive trains do not extend substantially above the conveying surface and do not interfere with loading and unloading of objects from that side of the conveyor. As noted, if possible under the load requirements, it is preferable that the secondary drive trains do not extend at all above the conveying surface.

Such smaller secondary sprockets are incapable of carrying and transferring the high levels of torque which the primary sprockets carry and transfer. However, since the present invention utilizes a plurality of secondary drive trains in addition to a primary drive train, the secondary drive trains are shorter and do not have to carry and transfer high levels of torque. For example, in the embodiment shown and described, the primary drive train drives twenty rollers, ten in each direction, while the secondary drive trains each drive only one roller.

It is seen that the preferred embodiment of the present invention results in a conveyor having a high side and low side. The high side of the conveyor includes components, such as a drive train, which can extend substantially above the conveying surface of the conveyor. The ability to have a conveyor with a high side allows the use of large size components, such as a drive train with large diameter sprockets which are economical, durable and capable of supplying sufficient torque to power the roller conveyors.

The low side of the conveyor preferably has no components which extend substantially above the conveying surface of the conveyor. The purpose for having a conveyor with a low side is to allow objects to be loaded or unloaded from a side of the conveyor without having to lift the objects over interfering apparatus. This is particularly important if a fork lift is used to load and unload the objects because it is considerably more difficult to maneuver the blades of the fork lift over interfering apparatus than insert and withdraw objects in a simple generally horizontal movement.

As shown in FIG. 1, the high side of conveyor 20 is the left side, the side on which the primary drive train is located, while the low side of conveyor 20 is the right side, the side on which the secondary drive train is located.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and their equivalents.

What is claimed is:

1. A conveyor comprising:
   a frame;
   a series of closely spaced rollers mounted on the frame, each roller having an outer circumferential surface, a first end portion on a first side of the conveyor and a second end portion on a second side of the conveyor, the rollers including master rollers and slave rollers interspersed between the master rollers;
   a drive train for driving every roller in the series of rollers, the drive train including a primary drive train for driving the master rollers and secondary drive trains for driving the slave rollers from respective master rollers, the primary drive train including primary drive elements located on the master rollers and means for connecting and driving the primary drive elements, the primary drive elements and the means for connecting and driving the primary drive elements together forming an effective outer radius for each primary drive element, the secondary drive train including secondary drive elements located on the rollers and means for connecting and driving the secondary drive elements, the secondary drive elements and the means for connecting and driving the secondary drive elements together forming an effective outer radius for each secondary drive element, the effective outer radius of each of the primary drive elements being greater than the radial distance from the center of the roller on which it is located to the outer circumferential surface of the nearest roller in the series of rollers, the effective outer radius of each of the secondary drive elements being less than the radial distance from the center of the roller on which it is located to the outer circumferential surface of the nearest roller in the series of rollers.

2. The conveyor of claim 1, wherein the primary drive elements are located on the outer circumferential surfaces of the master rollers.

3. The conveyor of claim 1, wherein the primary drive elements are located on the first end portion of the master rollers and the secondary drive elements are located on the second end portion of the rollers.

4. The conveyor of claim 1, wherein the primary drive elements are located on the outer circumferential surfaces of the first end portion of the master rollers and the secondary drive elements are located on the axial ends of the second end portion of the rollers.

5. The conveyor of claim 1, including axles on which the rollers are journalled, portions of the axles extending from the first end portion of the rollers and fixed to the frame on the first side of the conveyor, portions of the axles extending from the second end portion of the rollers and fixed to the frame on the second side of the conveyor.

6. The conveyor of claim 1, wherein pairs of adjacent secondary drive elements have effective outer radii which when totaled are less than the distance between the centers of the rollers on which the pairs of adjacent secondary drive elements are located.

7. The conveyor of claim 1, wherein the primary drive train includes a drive motor arrangement connected to the master rollers near the center of the series of rollers.

8. The conveyor of claim 1, wherein the outer circumferential surfaces of the rollers define a conveyor surface which is at least as high in elevation a the secondary drive trains.

9. The conveyor of claim 1, wherein the radius of the outer circumferential surface of the rollers is at least as great as the effective outer radius of the secondary drive elements.

10. The conveyor of claim 1, wherein the means for connecting and driving the primary drive elements are a plurality of driving means in series, each connecting pairs of the primary drive elements.

11. A conveyor comprising:
a frame;
a series of closely spaced rollers mounted on the frame, each roller having an outer circumferential surface, a first end portion on a first side of the conveyor and a second end portion on a second side of the conveyor, the rollers including master rollers and slave rollers interspersed between the master rollers;
a drive train for driving every roller in the series of rollers, the drive train including a primary drive train for driving the master rollers and secondary drive trains for driving the slave rollers from respective master rollers, the primary drive train including primary drive elements located on the master rollers and endless loop means for connecting and driving the primary drive elements, the primary drive elements and the means for connecting and driving the primary drive elements together forming an effective outer radius for each primary drive element, the secondary drive train including secondary drive elements located on the rollers and means for connecting and driving the secondary drive elements, the secondary drive elements and the means for connecting and driving the secondary drive elements together forming an effective outer radius for each secondary drive element, the effective outer radius of each of the primary drive elements being greater than the radial distance from the center of the roller on which it is located to the outer circumferential surface of the nearest roller in the series of rollers, the effective outer radius of each of the secondary drive elements being less than the radial distance from the center of the roller on which it is located to the outer circumferential surface of the nearest roller in the series of rollers.

12. The conveyor of claim 11, wherein the primary drive elements are primary sprockets.

13. The conveyor of claim 11, wherein the primary drive elements are primary sprockets and the secondary drive elements are secondary sprockets.

14. The conveyor of claim 11, wherein the primary drive elements are primary sprockets located on the outer circumferential surfaces of the master rollers.

15. The conveyor of conveyor of claim 11, wherein the primary drive elements are primary sprockets located on the first end portion of the master rollers and the secondary drive elements are located on the second end portion of the rollers.

16. The conveyor of conveyor of claim 11, wherein the primary drive elements are primary sprockets located on the outer circumferential surface of the first end portion of the master rollers and the secondary drive elements are located on the second end portion of the rollers.

17. The conveyor of claim 11, wherein the primary drive elements are primary sprockets located on the first end portion of the master rollers and the secondary drive elements are secondary sprockets located on the second end portion of the rollers.

18. The conveyor of claim 11, wherein the primary drive elements are primary sprockets located on the outer circumferential surface of the first end portion of the master rollers and the secondary drive elements are secondary sprockets located on the second end portion of the rollers.

19. The conveyor of claim 11, wherein the primary drive elements are primary sprockets located on the outer circumferential surface of the first end portion of the master rollers and the secondary drive elements are secondary sprockets located on the axial end of the second end portion of the rollers.

20. The conveyor of claim 11, including axles on which the rollers are journalled, portions of the axles extending from the first end portion of the rollers and fixed to the frame on the first side of the conveyor, portions of the axles extending from the second end portion of the rollers and fixed to the frame on the second side of the conveyor, and wherein the primary drive elements are primary sprockets located on the first end portion of the master rollers and the secondary drive elements are secondary sprockets located on the second end portion of the rollers.

21. The conveyor of claim 11, including axles on which the rollers are journalled, portions of the axles extending from the first end portion of the rollers and fixed to frame on the first side of the conveyor, portions of the axles extending from the second end portion of the rollers and fixed to the frame on the second side of the conveyor, and wherein the primary drive elements are primary sprockets located on the first end portion of the master rollers and the secondary drive elements are secondary sprockets located on the axial end of the second end portion of the rollers.

22. The conveyor of claim 11, including axles on which the rollers are journalled, portions of the axles extending from the first end portion of the rollers and fixed to the frame on the first side of the conveyor, portions of the axles extending from the second end portion of the rollers and fixed to the frame on the second side of the conveyor, and wherein the primary drive elements are primary sprockets located on the outer circumferential surface of the first end portion of the master rollers and the secondary drive elements are secondary sprockets located on the second end portion of the rollers.

23. The conveyor of claim 11, including axles on which the rollers are journalled, portions of the axles extending from the first end portion of the rollers and fixed to the frame on the first side of the conveyor, portions of the axles extending from the second end portion of the rollers and fixed to the frame on the second side of the conveyor, and wherein the primary drive elements are primary sprockets located on the outer circumferential surface of the first end portion of the master rollers and the secondary drive elements are secondary sprockets located on the axial end of the second end portion of the rollers.

24. The conveyor of claim 11, wherein pairs of adjacent secondary drive elements have effective outer radii which when totaled are less than the distance between the centers of the rollers on which the pairs of adjacent secondary drive elements are located.

25. The conveyor of claim 11, wherein the primary drive train includes a drive motor arrangement connected to the master rollers near the center of the series of rollers.

26. The conveyor of claim 11, wherein the outer circumferential surfaces of the rollers define a conveyor surface which is at least as high in elevation as the secondary drive trains.

27. The conveyor of claim 11, wherein the radius of the outer circumferential surface of the rollers is at least as great as the effective outer radius of the secondary drive elements.

28. The conveyor of claim 11, wherein the means for connecting and driving the primary drive elements are a plurality of driving means in series, each connecting pairs of the primary drive elements.

* * * * *

UNITED STATES PATENT AND TRADEMARK OFFICE
CERTIFICATE OF CORRECTION

PATENT NO. : 5,056,653

DATED : October 15, 1991

INVENTOR(S) : William G. Lancaster

It is certified that error appears in the above-identified patent and that said Letters Patent is hereby corrected as shown below:

IN THE CLAIMS:

Claim 8, col. 9, line 48, change "a" to --as--.

Claim 21, col. 11, line 9, after "to" insert --the--.

IN THE ABSTRACT:

Line 7, change "interpersed" to --interspersed--.

Signed and Sealed this

Second Day of March, 1993

Attest:

STEPHEN G. KUNIN

*Attesting Officer*     *Acting Commissioner of Patents and Trademarks*